W. A. LOUNSBERRY.
CLUTCH FOR PAPER ROLLS.
APPLICATION FILED MAY 12, 1911.
1,001,056.
Patented Aug. 22, 1911.
2 SHEETS—SHEET 1.
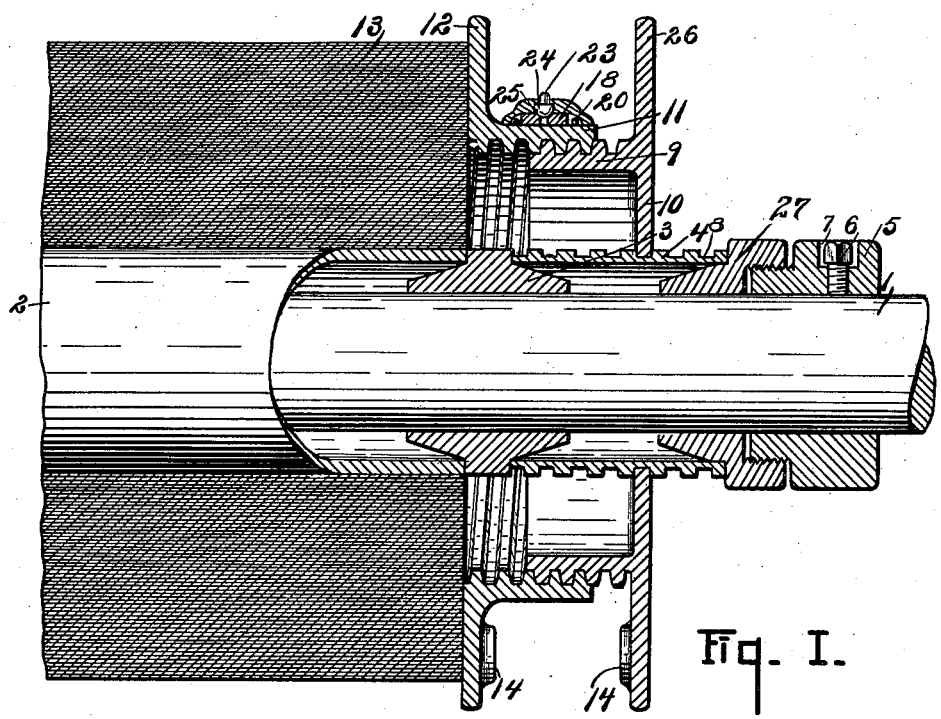
Fig. I.
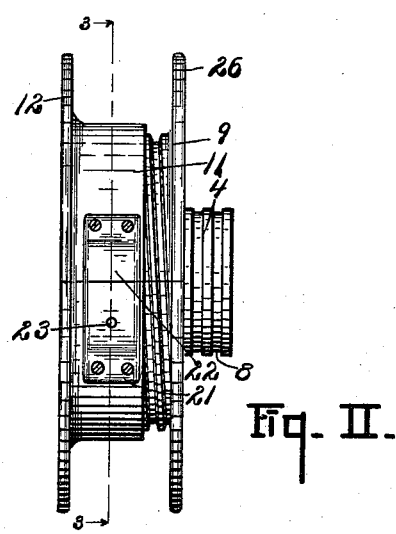
Fig. II.
Witnesses
M. P. Woodruff.
L. G. Greenfield
Inventor
Ward A. Lounsberry
By Chappell & Earl
Attorneys W. A. LOUNSBERRY.
CLUTCH FOR PAPER ROLLS.
APPLICATION FILED MAY 12, 1911.
1,001,056.
Patented Aug. 22, 1911.
2 SHEETS—SHEET 2.
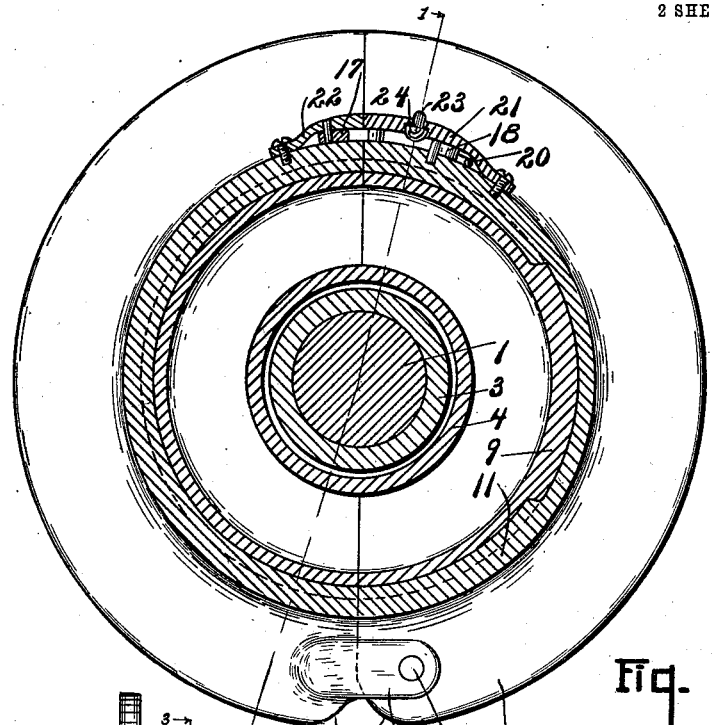
Fig. III.
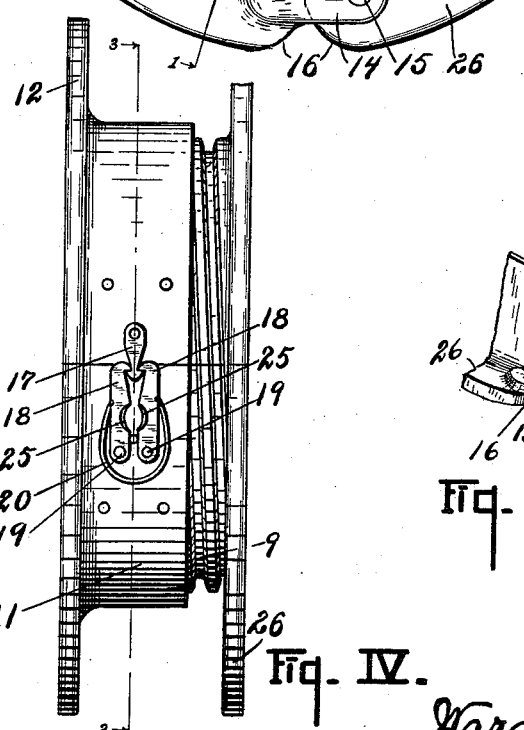
Fig. IV.
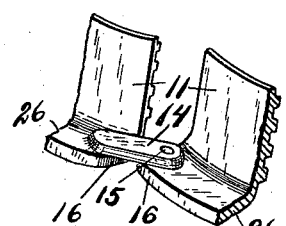
Fig. V.

UNITED STATES PATENT OFFICE.

WARD A. LOUNSBERRY, OF KALAMAZOO, MICHIGAN.

CLUTCH FOR PAPER-ROLLS.

1,001,056.  Specification of Letters Patent. Patented Aug. 22, 1911.

Application filed May 12, 1911. Serial No. 626,751.

*To all whom it may concern:*

Be it known that I, WARD A. LOUNSBERRY, a citizen of the United States, residing at Kalamazoo, county of Kalamazoo, State of Michigan, have invented certain new and useful Improvements in Clutches for Paper-Rolls, of which the following is a specification.

This invention relates to improvements in clutches for paper rolls.

In the manufacture of paper, the finished product is wound upon suitable cores, commonly pieces of pipe, which are supported by a suitable shaft. The roll is driven from the shaft. It has been quite common practice, heretofore, to use collar-like clutches of wood and clamp the clutches against the roll by means of a small rope, the rope being engaged over a screw or pin on the shaft and wound against the collar. These clutch collars must be applied while the shaft is revolving at a high rate of speed. Owing to the operators sometimes becoming entangled with the rope, serious accidents have occurred, the number of accidents and danger being such that in some instances laws have been enacted to prohibit the use of the dangerous devices.

The main objects of my invention are: First, to provide an improved roll clutch which can be quickly applied while the shaft is in motion without danger to the operator. Second, to provide an improved roll clutch embodying these advantages which is very effective. Third, to provide an improved roll clutch which is simple and economical in structure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this application, in which:

Figure I is a detail longitudinal section through a structure embodying the features of my invention taken on a line corresponding to the broken line 1—1 of Fig. III, my improved clutch being shown in operative relation to a roll of paper, the shaft and a portion of the roll core being shown in full lines. Fig. II is a plan view of one of my improved clutches. Fig. III is a transverse section taken on a line corresponding to line 3—3 of Fig. IV. Fig. IV is a plan view corresponding to that of Fig. II, with the housings for the catch removed. Fig. V is a detail perspective, showing one of the hinges for the clutch member sections, the sections being swung apart.

In the drawing, similar reference characters refer to similar parts throughout the several views, and the sectional views are taken looking in the direction of the little arrows at the ends of the section lines.

Referring to the drawing, the shaft 1 is provided with suitable bearings and driving connections not illustrated. The core 2 is a piece of pipe, such as is commonly used for the purpose. On the shaft 1 is a core member 3 having oppositely tapered ends, the core 2 being arranged on the inner end, and a sleeve-like shaft member 4 on the outer end.

The shaft member 4 is secured by means of the collar 5, which is adjustably held in position by the set screw 6. The collar is provided with a recess 7 for the set screw. The collar is provided with an adjustable section 27 which is tapered to receive the shaft member 4. By adjusting the member 27 the parts may be effectively clamped up. The shaft member 4 has a series of peripheral grooves 8. The clutch member 9 is provided with an inwardly-projecting flange 10, adapted to be engaged with these grooves, as is illustrated.

The coacting clutch member 10 is provided with an outwardly projecting flange 12, which engages the end of the roll of paper, as 13. The clutch members are cylindrical, and axially divided into sections, the sections being hinged to each other so that they can be swung apart to be placed on the shaft. The hinges are preferably in the form of the arms 14 on one section which overlap and are pivoted at 15 to the flanges of the other sections. The edges of the flanges are cut away at 16 to allow the sections to swing apart.

The clutch members are threaded together, the member 9 being externally threaded, while the member 11 is internally threaded, so that it is adjustably mounted on the member 9. A catch is mounted on the member 11 and consists of the fixed catch member 17 and the coacting catch dogs 18, the member 17 being provided with a head with which the dogs 18 engage, the dogs being pivoted at 19 and yieldingly supported by means of the U-shaped spring 20. Housings 21 and 22 are provided for the catch members.

The button 23 is provided with a head 24, which coacts with the inclined surfaces 25 of the dogs 18, see Figs. III and IV. I thus secure a simple compact spring catch which automatically engages when the parts are brought together.

The clutch member 9 is provided with a flange 26 at its outer end, the catch being arranged between the flanges 12 and 25 so as to be guarded thereby.

In applying the clutch, the catch is released and the sections swing apart on their hinges. In order to do this, it is necessary to bring the joints of both clutch members into alinement. The opened clutch members are then placed over the shaft and closed with the flange 10 in one of the grooves 8 of the shaft member 4. The catch automatically engages, so that the operator is merely required to swing the sections together. The clutch member 11 is then held either by grasping the flange 12, or by means of a stick or tool. This, owing to the threaded engagement of the clutch member moves the member 11 over into engagement with the end of the roll. When it clamps the roll with driving engagement, it is released. This adjustment is quickly effected and without danger to the operator. Further, the clutch is a very effective one.

I have illustrated and described my invention in a simple and practical embodiment.

I am aware that various structural modifications are possible, but as these structural modifications will no doubt be readily understood by those skilled in the art to which this invention relates, I have not attempted to illustrate or describe the same herein.

Having thus described my invention, what I claim is new and desire to secure by Letters Patent is:

1. In a structure of the class described, the combination with a shaft, of an oppositely tapered core member mounted on said shaft; a tubular roll core arranged on the inner end of said core member; a shaft member having a plurality of peripheral grooves arranged on the outer end of said core member; a clamping collar for said shaft member; and a pair of threaded cylindrical clutch members, said members being formed of axially divided hinged sections, the outer member being provided with a catch, said members being provided with outwardly projecting flanges at their outer ends, the hinges being disposed on said flanges, the said catch being arranged between the flanges, the inner member being provided with an inwardly projecting flange adapted to engage the grooves of said shaft member.

2. In a structure of the class described, the combination with a shaft, of an oppositely tapered core member mounted on said shaft; a tubular roll core arranged on the inner end of said core member; a shaft member having a plurality of peripheral grooves arranged on the outer end of said core member; a clamping collar for said shaft member; and a pair of threaded cylindrical clutch members, said members being formed of axially divided hinged sections, the outer member being provided with a catch, the inner member being provided with an inwardly projecting flange adapted to engage the grooves of said shaft member.

3. In a structure of the class described, the combination of a shaft member provided with a plurality of peripheral grooves; a cylindrical driven member having an inwardly-projecting flange adapted to engage the grooves of said shaft member; a roll engaging member mounted on said driven member and having threaded engagement therewith, said members being axially divided and being provided with outwardly-projecting flanges at their outer ends; arm-like hinge members on the flange of one section pivotally connected to the flange of the other section; a catch for the engaging member sections consisting of a fixed catch member mounted on one of the sections; a pair of facing catch dogs mounted on the other; a spring for said dogs; and housings for said catch members mounted on their respective sections.

4. In a structure of the class described, the combination of a shaft member provided with a plurality of peripheral grooves; a cylindrical driven member having an inwardly-projecting flange adapted to engage the grooves of said shaft member; a roll engaging member mounted on said driven member and having threaded engagement therewith, said members being axially divided and being provided with outwardly-projecting flanges at their outer ends; arm-like hinge members on the flange of one section pivotally connected to the flange of the other section; and a catch for the engaging member sections.

5. In a structure of the class described, the combination with a shaft member provided with a plurality of peripheral grooves; an externally threaded driven member; an engaging member internally threaded to coact with said driven member, said members being formed of axially divided sections; and connecting means for said sections, all coacting for the purpose specified.

6. In a structure of the class described, the combination of a shaft member provided with peripheral grooves, a cylindrical driven member having an inwardly-projecting flange adapted to engage the grooves of said shaft member; a roll engaging member mounted on said driven member and having threaded engagement therewith, said members being axially divided and being provided with outwardly-projecting flanges at their outer ends; hinge members on said flanges; a catch for the engaging member sections consisting of a fixed catch member mounted on one of the sections; a pair of facing catch dogs mounted on the other; a spring for said dogs; and housings for said catch members mounted on their respective sections.

7. In a structure of the class described, the combination of a shaft member provided with peripheral grooves, a cylindrical driven member having an inwardly-projecting flange adapted to engage the grooves of said shaft member; a roll engaging member mounted on said driven member and having threaded engagement therewith, said members being axially divided and being provided with outwardly-projecting flanges at their outer ends; hinge members on said flanges; and a catch for the engaging member sections.

8. The combination of a shaft engaging member; a coacting roll engaging member having threaded engagement with said shaft member, said members being axially divided and provided with outwardly-projecting flanges at their outer ends; an arm-like hinge member on the flange of one section pivotally connected to the flange of the other; and a catch for the sections arranged between the flanges.

9. The combination of a shaft member; a roll engaging member having threaded engagement with said shaft member, said members being axially divided, the sections having hinge connections at one side; and an automatic catch at the other.

10. In a structure of the class described, the combination with a shaft member; a driven member; an engaging member having threaded engagement with said driven member, said members being formed of sections; and means for detachably securing said sections, coacting for the purpose specified.

In witness whereof, I have hereunto set my hand and seal in the presence of two witnesses.

WARD A. LOUNSBERRY. [L. S.]

Witnesses:
 LUELLA G. GREENFIELD,
 PEARL E. LILLIE.

Copies of this patent may be obtained for five cents each, by addressing the "Commissioner of Patents, Washington, D. C."